US011657123B2

United States Patent
Watanabe et al.

(10) Patent No.: US 11,657,123 B2
(45) Date of Patent: May 23, 2023

(54) METHOD AND APPARATUS FOR PEOPLE FLOW ANALYSIS USING SIMILAR-IMAGE SEARCH

(71) Applicant: Hitachi, Ltd., Tokyo (JP)

(72) Inventors: Yuki Watanabe, San Jose, CA (US); Ravigopal Vennelakanti, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 296 days.

(21) Appl. No.: 17/066,121

(22) Filed: Oct. 8, 2020

(65) Prior Publication Data

US 2022/0114381 A1 Apr. 14, 2022

(51) Int. Cl.
*G06K 9/62* (2022.01)
*G06F 18/22* (2023.01)
*G06V 40/16* (2022.01)
*G06V 10/75* (2022.01)

(52) U.S. Cl.
CPC .......... *G06F 18/22* (2023.01); *G06V 10/7515* (2022.01); *G06V 40/169* (2022.01); *G06V 40/172* (2022.01)

(58) Field of Classification Search
CPC .... G06V 40/16–40/179; G06V 40/173; G06V 20/53; G06V 40/161; G06T 2207/30232; G06T 7/292
See application file for complete search history.

(56) References Cited

U.S. PATENT DOCUMENTS

| 2015/0371403 A1* | 12/2015 | Koyama | G06V 40/172 |
| | | | 382/103 |
| 2018/0096209 A1* | 4/2018 | Matsuda | G06V 40/10 |

FOREIGN PATENT DOCUMENTS

| JP | 2018055607 A | 4/2018 |
| WO | 2015087820 A1 | 6/2015 |
| WO | 2019188079 A1 | 10/2019 |

OTHER PUBLICATIONS

European Patent Office. Extended European Search Report dated Feb. 18, 2022. European Patent Application No. 21191875.0-1207 English Language. 12 pages.
Presti, Liliana Lo et al. "Path Modeling and Retrieval in Distributed Video Surveillance Databases." IEEE Transactions on Multimedia, vol. 14, No. 2. Apr. 2012. pp. 346-360.
Jain, Samvit et al. "ReXCam: Resource-Efficient Cross-Camera Video Analytics at Scale." University of California Berkeley, University of Chicago, Microsoft Research. arXiv: 1811.01268v4 [cs DC] Dec. 4, 2019. 15 pages.
(Continued)

*Primary Examiner* — Brian Werner
(74) *Attorney, Agent, or Firm* — Procopio, Cory, Hargreaves & Savitch LLP

(57) ABSTRACT

In example implementations described herein, person images obtained by object detection and tracking are stored in an image database. Then the system automatically samples a person image as a query of image search for past images. Filtering is performed on the search results to extract a person images having a similarity higher than certain threshold. Travel time is calculated by sorting information (camera identifier, time) attached to person images on a timeline, and the system detects gap between periods that the person appears in frame.

12 Claims, 16 Drawing Sheets

(56) References Cited

OTHER PUBLICATIONS

Kawanishi, Yasutomo et al. "Trajectory Ensemble: Multiple Persons Consensus Tracking across Non-overlapping Multiple Cameras over Randomly Dropped Camera Networks." Nagoya University, Aichi, JAPAN. 2017 IEEE Conference on Computer Vision and Pattern Recognition Workshops. IEEE Computer Society. 7 pages.
Xie, Qiaokang et al. "Progressive Unsupervised Person Re-Identification by Tracklet Association With Spatio-Temporal Regularization." IEEE Transactions on Multimedia, vol. 23, 2021. pp. 597-610.
Thoreau, Michael et al. "Deep Similarity Metric Learning for Real-Time Pedestrian Tracking." arXiv: 1806.07592v2 [cs.CV] Nov. 11, 2019. 7 pages.
Cao, Min et al. "From Groups to Co-traveler Sets: Pair Matching based person Re-identification Framework." Institute of Automation Chinese Academy of Sciences Beijing, China—Beijing Visytem Co. Ltd. 2017 IEEE International Conference on Computer Vision Workshops. IEEE Computer Society. 2473-9944/17 $31.00 © 2017 IEEE DOI 10.1109/ICCVW.2017.302. pp. 2573-2582.
Ukita, Norimichi et al. "People re-identification across non-overlapping cameras using group features." Graduate School of Information Science, Nara Institute of Science and Technology, Nara, JAPAN. Received Dec. 16, 2014; Accepted Jun. 26, 2015. Computer Vision and Image Understanding 144 (2016) pp. 228-236.
Zhu, Ji et al. "Group Re-Identification With Group Context Graph Neural Networks." IEEE Transactions on Multimedia, vol. 23, 2021. pp. 2614-2625.
Japan Patent Office. Notice of Reasons for Refusal dated Sep. 22, 2022. Japan Patent Application No. 2021-149287. English Language Translation. 5 pages.
Japan Patent Office Notice of Reasons for Refusal dated Sep. 22, 2022. Japan Patent Application No. 2021-149287. Japanese Language. 5 pages.
Moriguchi, Yusuke et al. Grouping People for Tracking across Non-overlapping Cameras. Yusuke Person Pursuit, Information Processing Society of Japan Report of Research and General Incorporated Foundation Information Processing Society of Japan Using Group Characteristic Quantity between Other Trinominals and Distributed Camera, Apr. 15, 2013, vol. 2013-CVIM-186, No. 2,pp. 1-8 (Document Showing a Well-known Technique). English Language Abstract.

* cited by examiner

| Image ID | Image | Time | Camera ID | Trajectory ID | Image feature | Attributes | ... |
|---|---|---|---|---|---|---|---|
| 1 |  | 2020/02/10 11:30:00 | 1 | 1 | [0.50, 0.58, 0.46,...] | Male (0.9) Female (0.1) Adult (0.8) Child (0.2) | ... |
| 2 |  | 2020/02/10 11:30:00 | 1 | 2 | [0.74, 0.02, 0.46,...] | Male (0.2) Female (0.8) Adult (0.9) Child (0.1) | ... |
| 3 |  | 2020/02/10 11:30:10 | 1 | 1 | [0.45, 0.54, 0.41,...] | Male (0.8) Female (0.2) Adult (0.9) Child (0.1) | ... |
| 4 |  | 2020/02/10 11:35:00 | 2 | 3 | [0.05, 0.13, 0.99,...] | Male (0.1) Female (0.9) Adult (0.0) Child (1.0) | ... |
| 5 |  | 2020/02/10 11:35:00 | 2 | 4 | [0.47, 0.57, 0.42,...] | Male (0.7) Female (0.3) Adult (0.7) Child (0.3) | ... |
| ... | ... | ... | ... | ... | ... | ... | ... |

METHOD AND APPARATUS FOR PEOPLE FLOW ANALYSIS USING SIMILAR-IMAGE SEARCH

BACKGROUND

Field

The present disclosure is generally related to object tracking systems, and more specifically, to people flow analysis based on object tracking in images.

Related Art

Object tracking technologies are roughly classified into "tracking within a camera" and "tracking across cameras".

Tracking within a camera is a technology that estimates the trajectory of a moving object (e.g. a person) from multiple frames captured by the same fixed camera. For example, the Lucas-Kanade method can generate motion vectors of small regions between frames. By observing motion vectors and grouping similar vectors in small areas, such related art implementations can track a person within the same camera. As long as the target person exists in the camera frame, the person can be tracked, so that the person images of another frame can be searched in the same video. Since the range of image processing can be limited based on the approximate speed of the moving object, computational cost is relatively low. If occlusion or frame-out happens, then the tracking may fail. However, since images are from same camera source, the accuracy of image recognition can be relatively high. FIG. 1 illustrates an example of tracking within a camera.

FIG. 2 illustrates an example of tracking across cameras. As illustrated in FIG. 2, motion vectors cannot be used for tracking across camera (so called re-identification), since images are obtained from different cameras that capture an independent space. When cameras share the field of view, motion vectors can be used, but accurate camera calibration is required. Therefore, tracking across cameras is generally realized by detecting person regions from camera images, and comparing the person images by using image features. In a related art implementation, there is a method of learning a neural network that determines whether two face images are of the same person or not. Image matching techniques can be applied to the whole-body image of person.

FIG. 3 illustrates an example flow for image matching. As illustrated in FIG. 3, the techniques can determine whether a person in test image is the same person in target image. Re-identification can be a relatively difficult task since the image conditions such as brightness, hue, scale of object, and so on, are varied depending on the camera source. Further, detecting people, extracting image feature and matching requires high computational power (e.g. special purpose processors such as graphics processing units (GPU))).

SUMMARY

Example implementations described herein are directed to the automatic estimation of travel time between two areas and generating statistics. To solve this problem, the system needs to track people appearing multiple cameras, within and across cameras. FIG. 4 illustrates an example of measuring travel time between areas, in accordance with an example implementation. As illustrated in FIG. 4, example implementations can calculate a travel time from difference between time when the person leaves from camera 1 and time when the person enters to camera 2.

In the related art implementations, tracking a specific person is selected manually by a user. On the other hand, it is difficult to use the system for automatic estimation of travel time between cameras without manual operation.

FIG. 5 illustrates an example related art use-scene for the purpose of travel time measurement. In the related art example of FIG. 5, the users have to input the tracking target to system, and check whether the results can be used to calculate travel time. In addition, the method of performing image matching to all person images in newly input images has a high computational cost.

In the example implementations described herein, the person images obtained by the object detection and tracking are stored in an image database. Then the system automatically samples a person image as a query of image searches for past images. Filtering is performed on the search results to extract a person images having a similarity higher than certain threshold. Travel time is calculated by sorting information (camera identifier (ID), time) attached to person images on the timeline, and detecting the gap between the periods that the person appears in the frame.

In example implementations, the travel time of a person can be automatically calculated without user operations. Further, it is possible to estimate travel time with a low calculation cost compared with one-by-one image matching methods.

Aspects of the present disclosure can involve a method, which involves detecting and tracking a person from images from a first camera; extracting image features from the detected and tracked person from the images from the first camera; storing the image features with information associated with the camera into a database; conducting a sample query to search the database for another person detected from images from a second camera. For the another person being within a threshold of similarity of the person from the images of the first camera, the method can further involve determining a gap of time between the person from the images of the first camera and the another person from the images from the second camera; and calculating travel time for the person from the gap of time.

Aspects of the present disclosure can involve a non-transitory computer readable medium, storing instructions for executing a process, the instructions which involves detecting and tracking a person from images from a first camera; extracting image features from the detected and tracked person from the images from the first camera; storing the image features with information associated with the camera into a database; conducting a sample query to search the database for another person detected from images from a second camera. For the another person being within a threshold of similarity of the person from the images of the first camera, the instructions can further involve determining a gap of time between the person from the images of the first camera and the another person from the images from the second camera; and calculating travel time for the person from the gap of time.

Aspects of the present disclosure can involve a system, which involves means for detecting and tracking a person from images from a first camera; means for extracting image features from the detected and tracked person from the images from the first camera; means for storing the image features with information associated with the camera into a database; means for conducting a sample query to search the database for another person detected from images from a second camera. For the another person being within a threshold of similarity of the person from the images of the first camera, the system can further involve means for determining a gap of time between the person from the images of the first camera and the another person from the images from the second camera; and means for calculating travel time for the person from the gap of time.

Aspects of the present disclosure can involve an apparatus, which can include a processor configured to detect and tracking a person from images from a first camera; extract image features from the detected and tracked person from the images from the first camera; store the image features with information associated with the camera into a database; conduct a sample query to search the database for another person detected from images from a second camera. For the another person being within a threshold of similarity of the person from the images of the first camera, the processor can be further configured to determine a gap of time between the person from the images of the first camera and the another person from the images from the second camera; and calculate travel time for the person from the gap of time.

DETAILED DESCRIPTION

Figure 1:
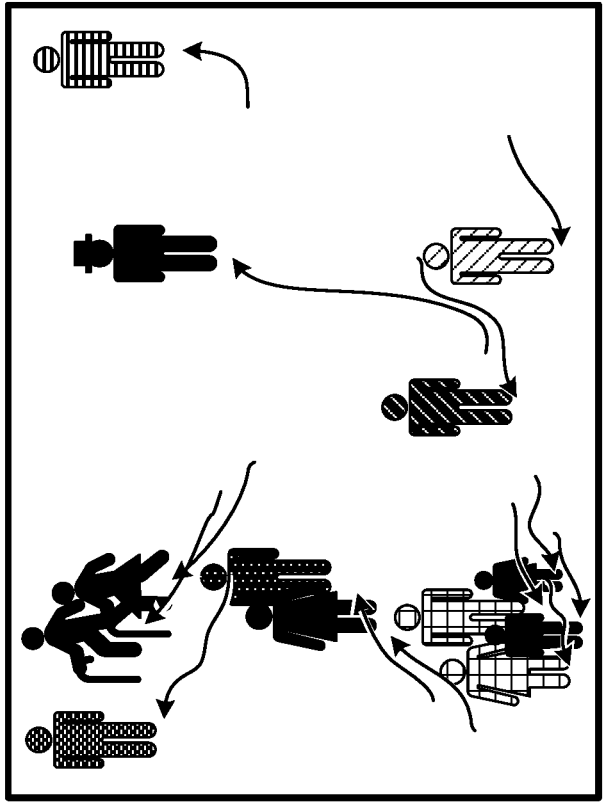
FIG. 1 illustrates an example of tracking within a camera.
Figure 1:
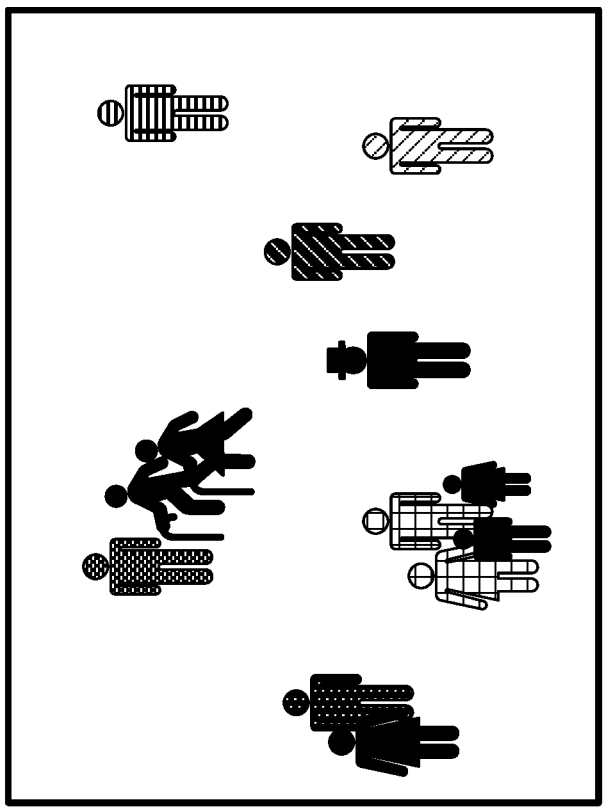
Figure 2:
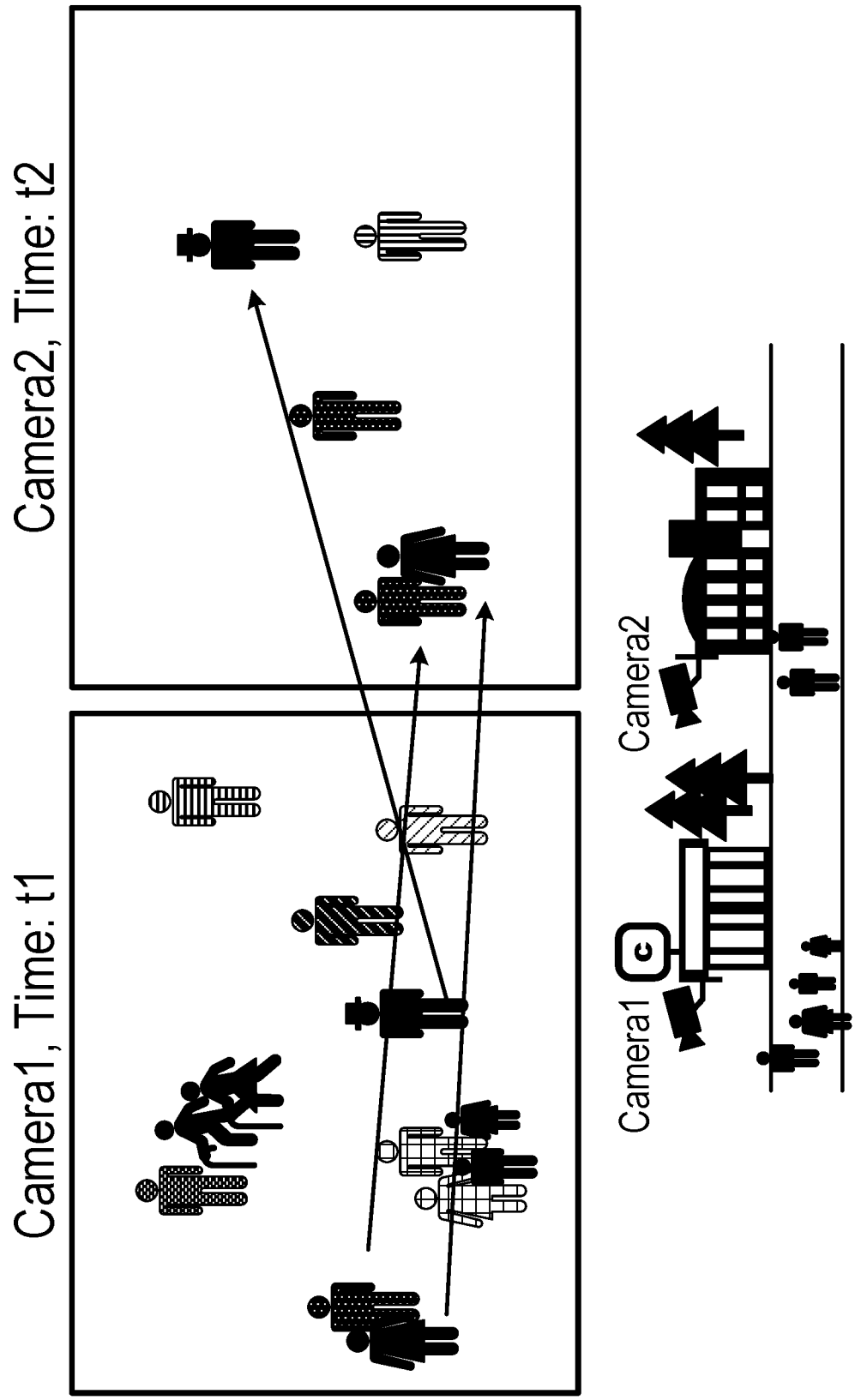
FIG. 2 illustrates an example of tracking across cameras.
Figure 3:
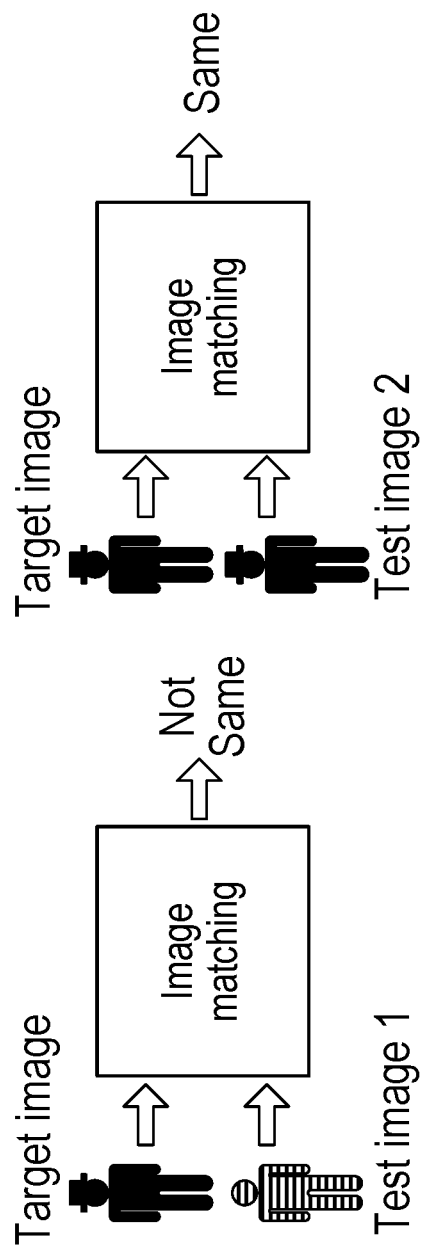
FIG. 3 illustrates an example flow for image matching.
Figure 4:
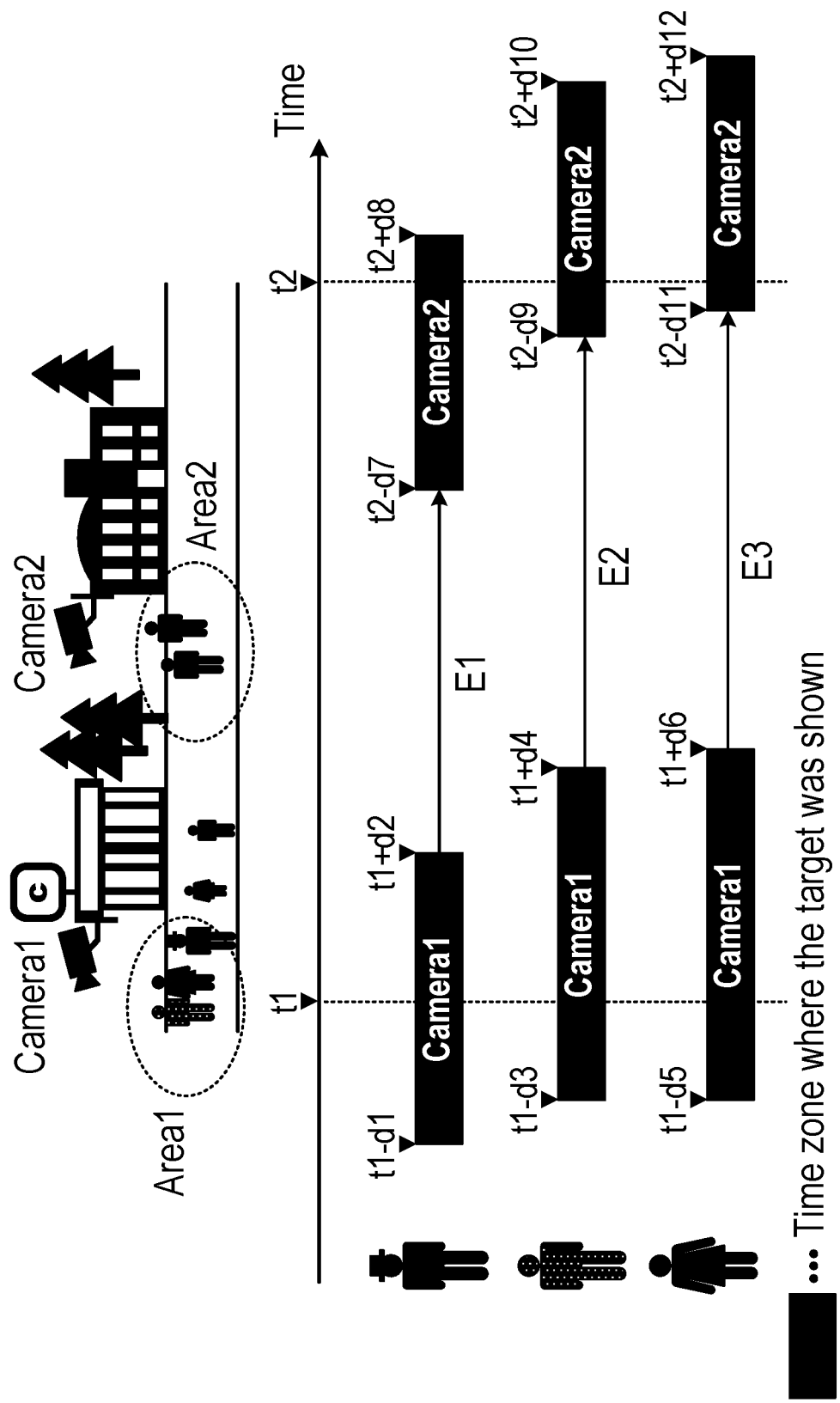
FIG. 4 illustrates an example of measuring travel time between areas, in accordance with an example implementation.
Figure 5:
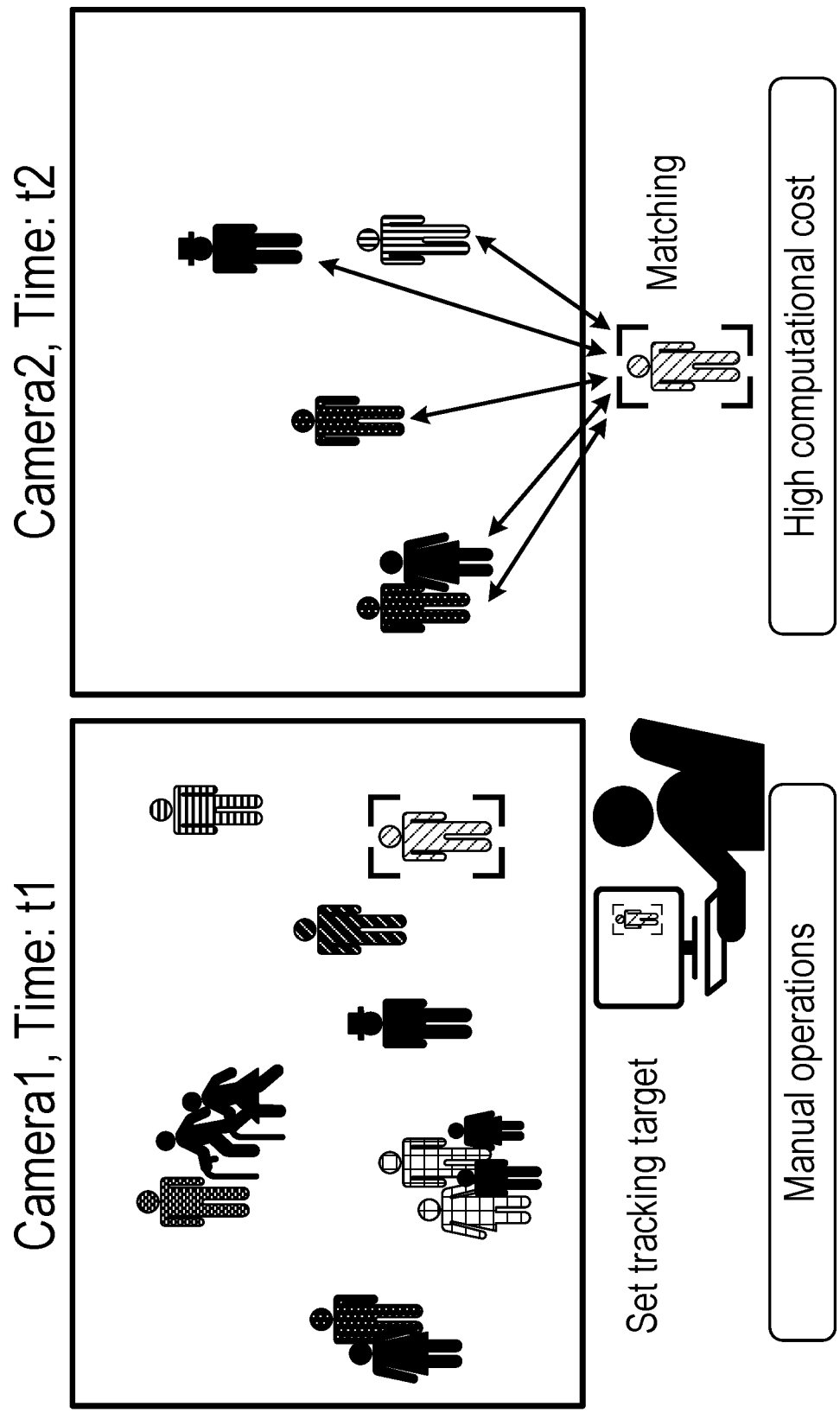
FIG. 5 illustrates an example related art use-scene for the purpose of travel time measurement.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 6:
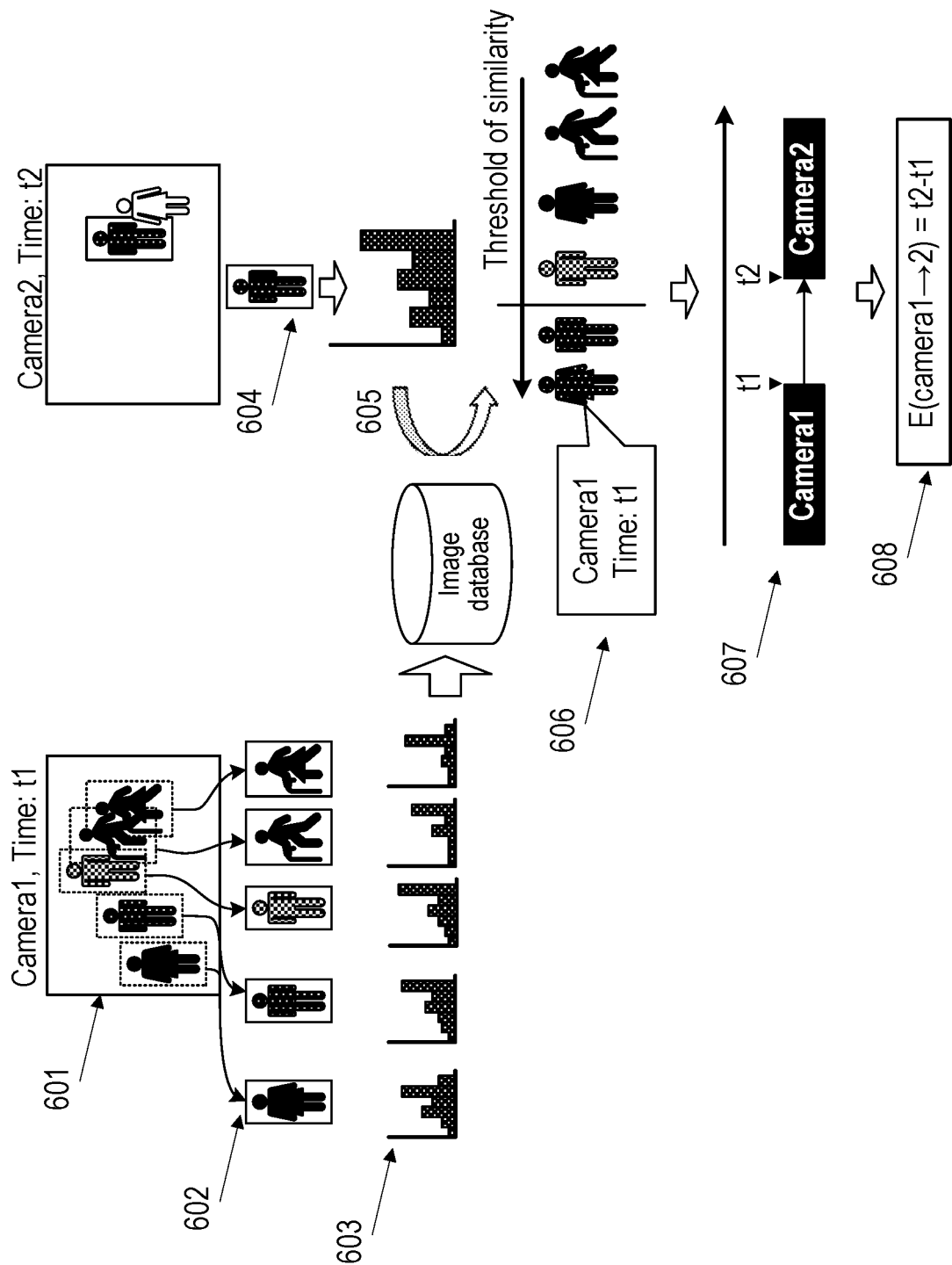
FIG. 6 illustrates an overall processing procedure of the example implementations described herein.

FIG. 6 illustrates an overall processing procedure of the example implementations described herein. As illustrated at 601, the system detects people in an input camera image and tracks a person between frames. Then, as illustrated at 602, the system extract image features from person images. Image classification such as person attributes (to estimate gender, age, etc.) can be executed to obtain additional information for the person image. This process is performed for all camera inputs connected to the system. Person images, image features, and additional information are linked and stored to image database as shown at 603. Also, the system can perform clustering of feature vectors to process high-speed similar-image search.

In addition to above registration process, the system can automatically sample person images as a query as shown at 604. The system automatically searches similar-image in past scenes by using a sampled query as illustrated at 605. The search results are filtered by similarity threshold as shown at 606, and information attached to person images is obtained. Using the information, the system detects time gaps between periods in which the query person appears as shown at 607 and 608. As illustrated at 608, the travel time for the person can be calculated as the delta between timestamps of the last image of the first camera and the first image of the second camera.

By repeating this process for multiple queries, the system can export statistics of travel time such as minimum travel time, maximum travel time, average travel time, and so on.

Figure 7:
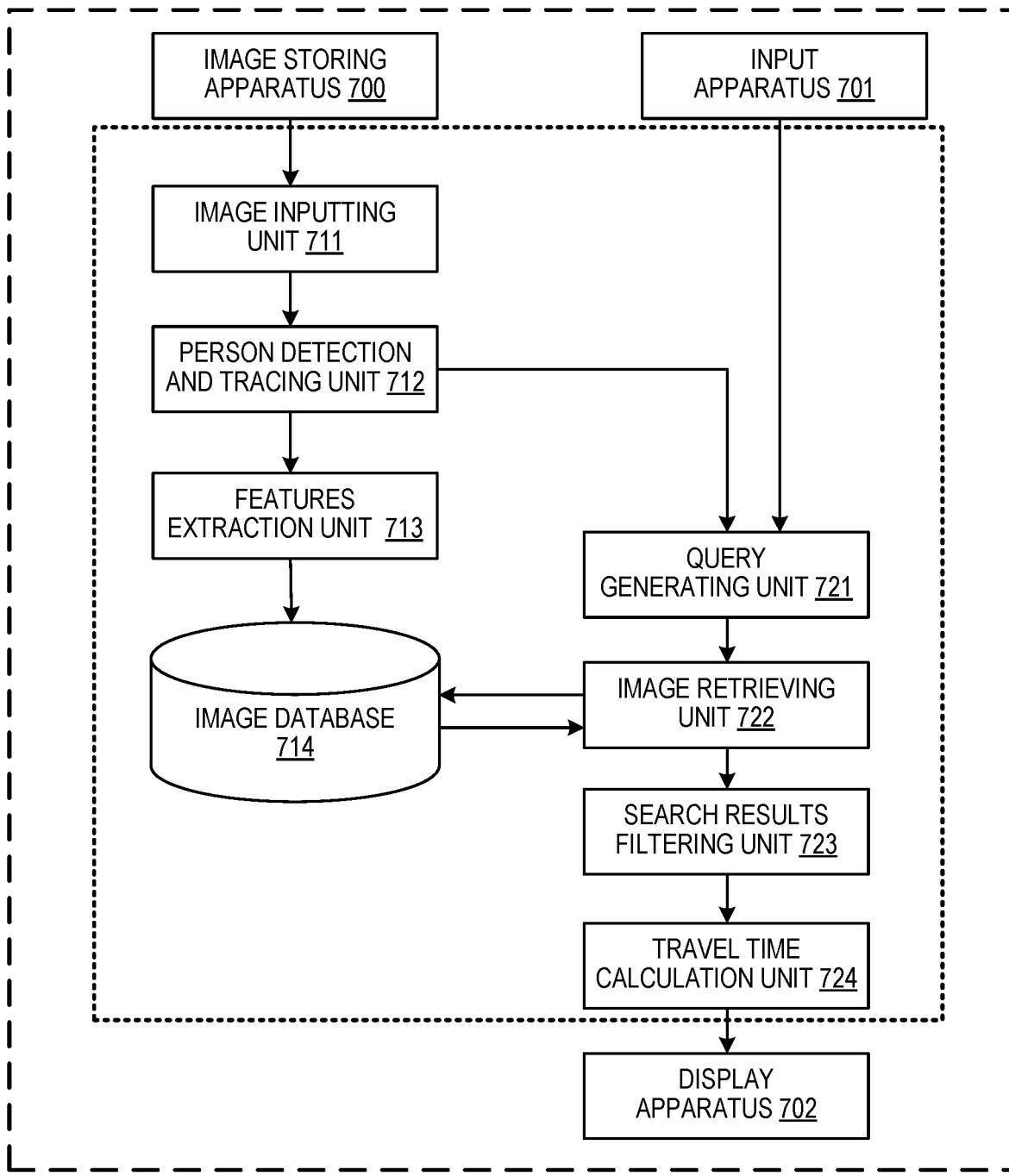
FIG. 7 illustrates an example system upon which example implementations may be implemented.

FIG. 7 illustrates an example system upon which example implementations may be implemented. In example implementations described herein, there are image storing apparatuses 700 such as cameras and input apparatuses 701 such as keyboards, touchscreens, and other input devices that is configured to provide query inputs in accordance with the desired implementation. Image storing apparatuses 700 provides images (e.g., video or image feedback) to image input unit 711 which can involve a physical memory buffer for processing by the other units of the system through a physical processor such as a central processing unit (CPU).

Person detection and tracing unit 712 involves software configured to detect people and trace their movement pathways from the images in the image input unit 711. Features extraction unit 713 is configured to extract features from the people detected from person detection and tracing unit 712 to classify the detected people in the images. The features and the associated detected people are stored in the image database 714.

Query generating unit 721 is configured to take in query inputs from input apparatuses 701 to form a query for accessing image database 714. Such query inputs can be in the form of selecting people from displayed images as displayed by display apparatus 702 through a mouse, keyboard, stylus, or so on in accordance with the desired implementation. Query inputs can also be provided by person detection and tracing unit 712 in an automatic sampling process. The forming of queries by query generating unit 721 can involve features extracted from the selected people on the displayed images, or otherwise in accordance with the desired implementation.

Image retrieving unit 722 is configured to submit the formed query from query generating unit 721 to retrieve candidate people from the image database 714 corresponding to the formed query.

Search results filtering unit 723 is configured to filter the candidate people retrieved from the image retrieving unit 722 through the filtering techniques as illustrated in FIGS. 12 to 15(*b*). Travel time calculation unit 724 is configured to determine the path and time taken for the tracked person.

Figure 8:
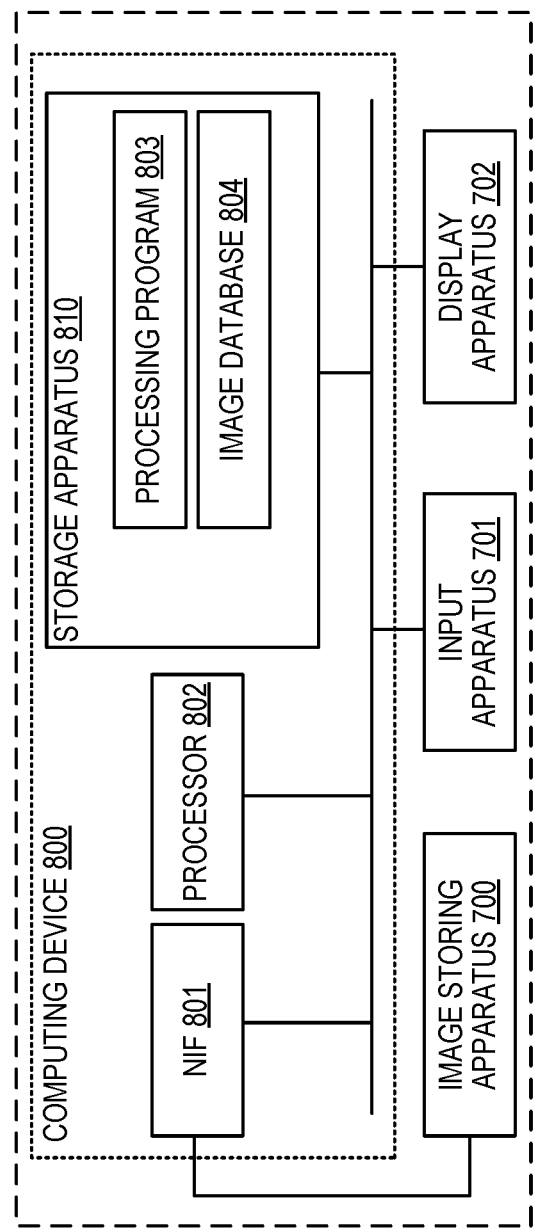
FIG. 8 illustrates an example hardware system upon which example implementations may be implemented.

FIG. 8 illustrates an example hardware system upon which example implementations may be implemented. In the example implementations of FIG. 8, there can be a system involving a computing device 800 (e.g., computer, laptop, etc.) having a storage apparatus 810. Computing device 800 can involve a network interface (NIF) 801 and one or more physical processors 802. Physical processors 802 can be in the form of hardware processors such as central processing units (CPUs). Storage apparatus 810 can be any form of storage in accordance with the desired implementation. Storage apparatus can include processing program 803 which is loaded and executed by the one or more physical processors to facilitate the example implementations described herein, as well as an image database 804 to manage the extracted features of corresponding images. Processing program 803 is configured to facilitate the functionality of the units illustrated in FIG. 7.

Figure 10:
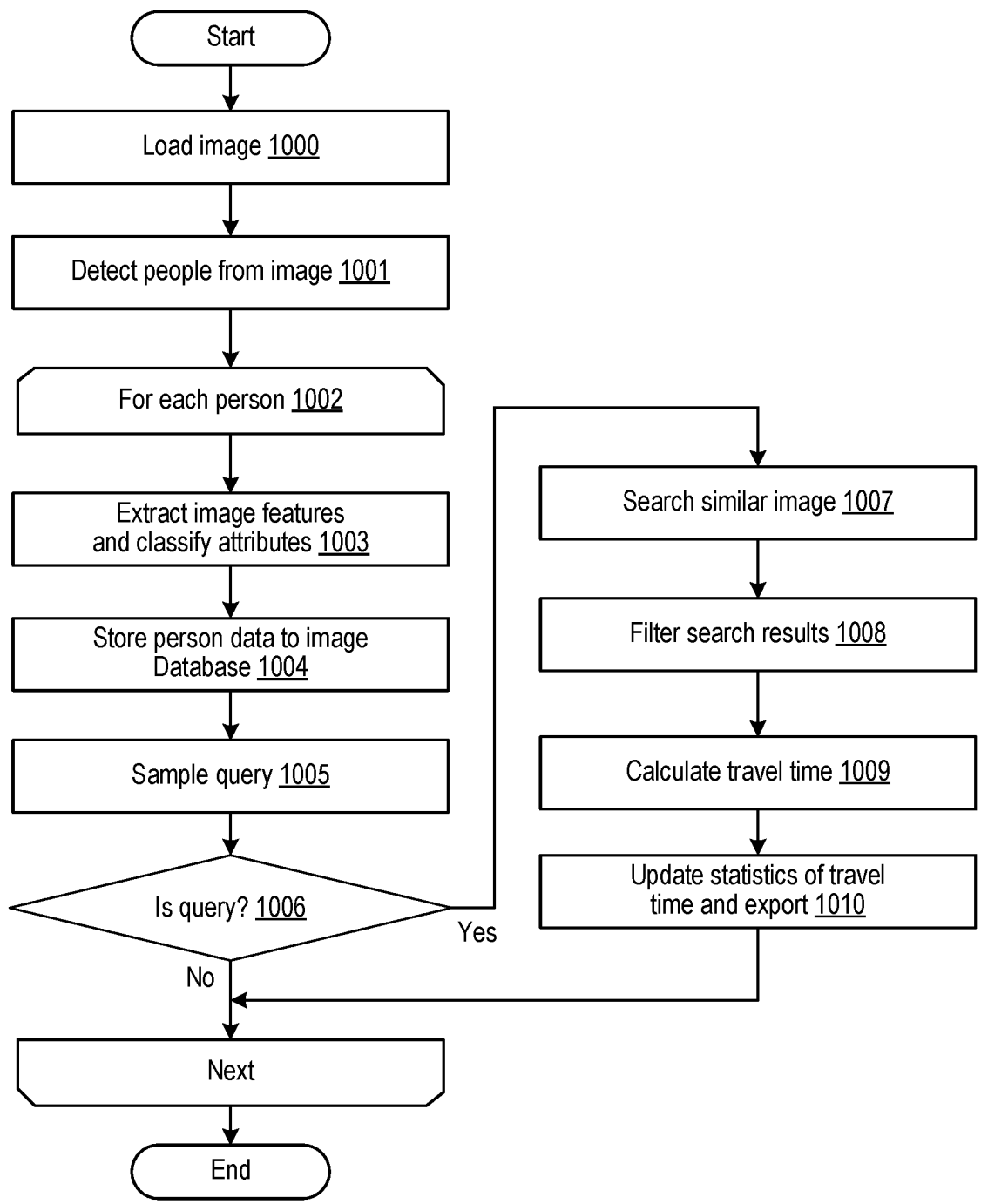
FIG. 10 illustrates an example flow diagram in accordance with an example implementation.

Processor(s) 802 can be configured to detect and track a person from images from a first camera as illustrated in FIG. 6 at 601 and FIG. 10 at 1001; extract image features from the detected and tracked person from the images from the first camera as illustrated at FIG. 6 at 602 and 603 and FIG. 10 at 1003; store the image features with information associated with the camera into a database as illustrated at 714 of FIG. 7 and 804 of FIG. 8; and conduct a sample query to search the database for another person detected from images from a second camera as shown at 604 and 605 of FIG. 6 and 1005 and 1006 of FIG. 10. For the another person being within a threshold of similarity of the person from the images of the first camera as shown at 606 of FIG. 6 and as shown at FIG. 11, processor(s) 802 can be configured to determine a gap of time between the person from the images of the first camera and the another person from the images from the second camera as shown at 607 and 608 of FIG. 6; and calculate travel time for the person from the gap of time as shown at 607 and 608 of FIG. 6 and 1009 of FIG. 10.

Figure 13:
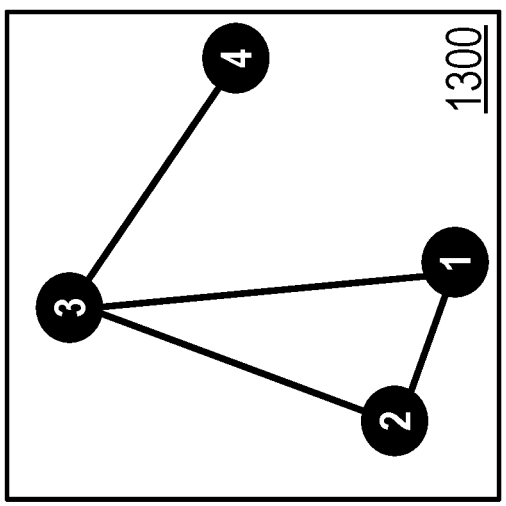
FIG. 13 illustrates an example of filtering search results through the use of camera topologies, in accordance with an example implementation.
Figure 13:
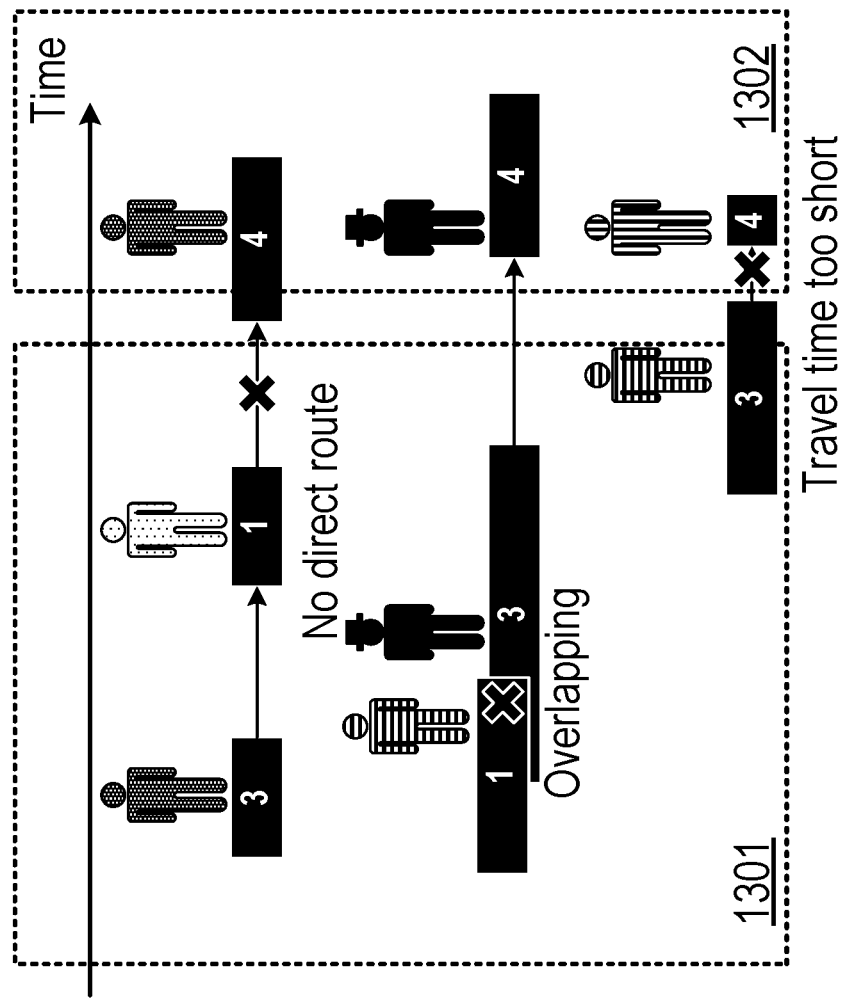

Processor(s) 802 can be configured to conduct the sample query to search the database for another person detected from the images from the second camera by obtaining results from the database based on feature matching with the image features associated with the sample query; filtering the results from the database associated with persons associated with cameras having no direct route to an area associated with the second camera; filtering the results from the database having overlapping image detection between the first camera and the second camera; and filtering the results from the database associated with persons having a travel time that does not exceed a threshold as illustrated at FIG. 13.

Figure 11:
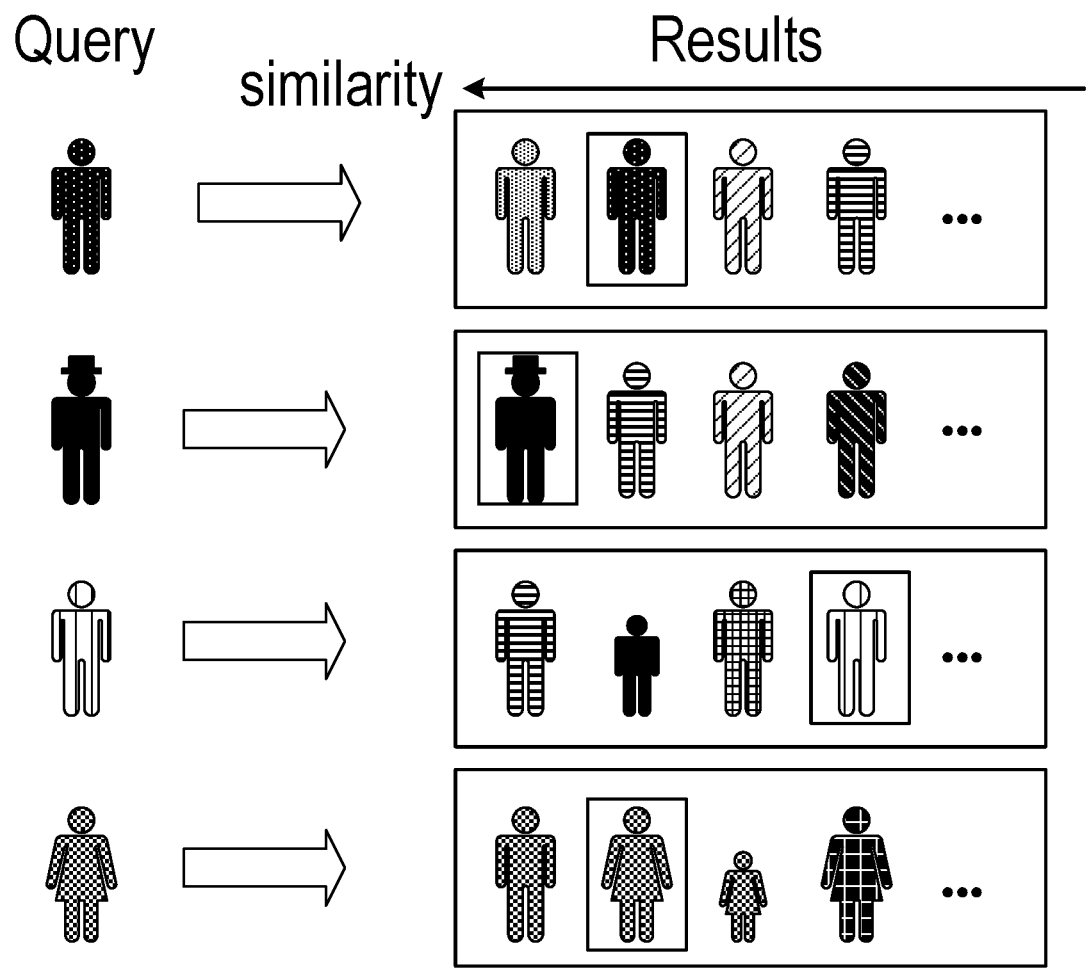
FIG. 11 illustrates an example of a submitted query with extracted results, in accordance with an example implementation.
Figure 14:
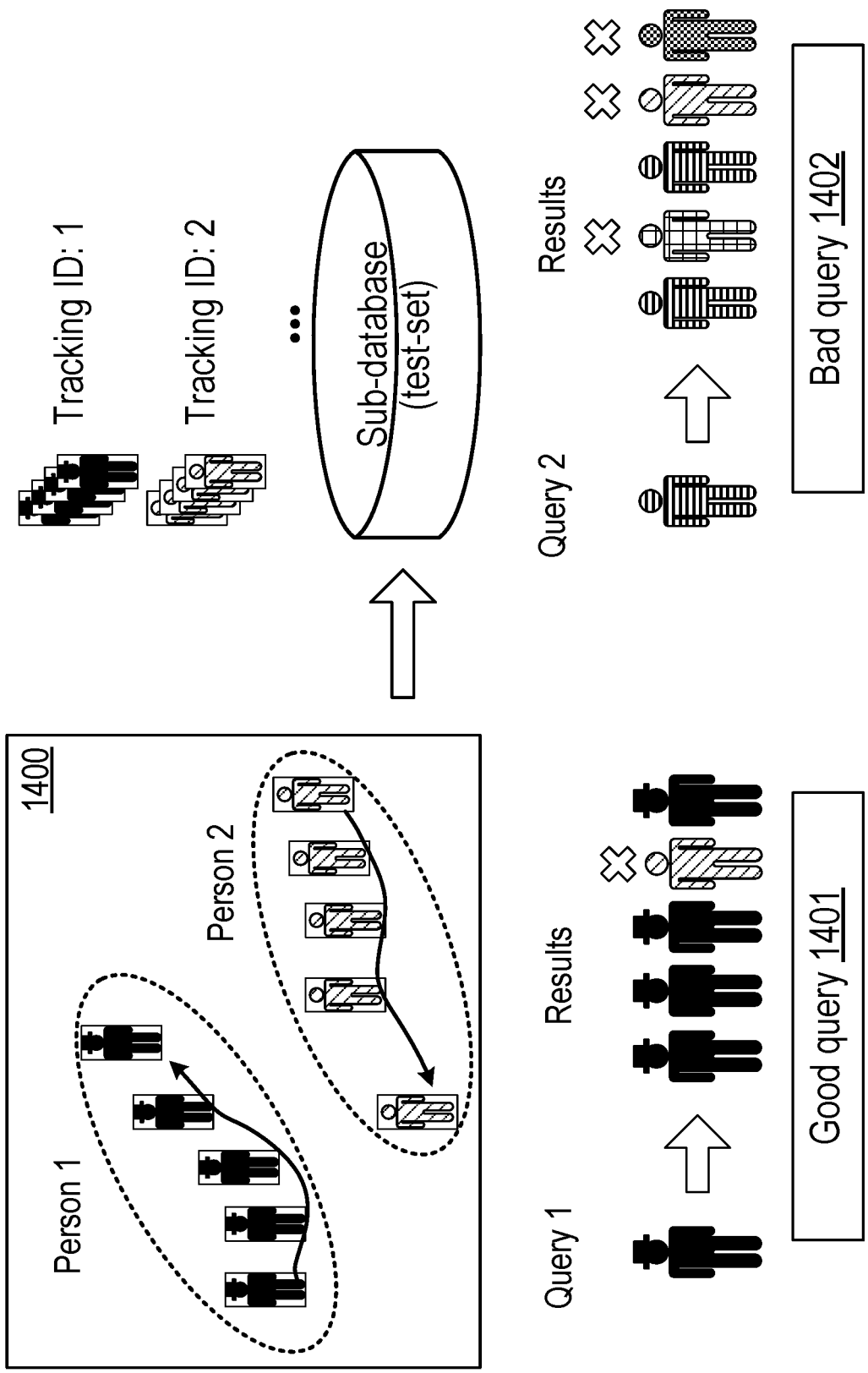
FIG. 14 illustrates an example of filtering results based on query sampling, in accordance with an example implementation.

Processor(s) 802 can be configured to conduct the sample query to search the database for another person detected from the images from the second camera by obtaining results from the database based on feature matching with the image features associated with the sample query; and filtering the results from the database based on person attributes as illustrated at FIG. 11 and FIG. 14.

Processor(s) 802 is configured to conduct the sample query to search the database for another person detected from the images from the second camera by evaluating the sample query, the processor configured to evaluate the sample query by generating a test set from the images of the another person from the second camera along a trajectory over time; associating the test set with a camera identifier associated with the second camera; searching the test set with the sample query based on feature matching with the image features associated with the sample query; and for the sample query retrieving results from the test set that does not meet an accuracy threshold, discarding the sample query as illustrated in FIG. 14.

Processor(s) 802 can be configured to detect and track the person from the images from the first camera by detecting and tracking one or more other persons in proximity to the person; and can be configured to extract the image features from the detected and tracked person from the images from the first camera further comprises extracting the image features from the one or more other persons in proximity to the person to derive group features as illustrated in FIGS. 15(*a*), 15(*b*) and 16.

Figure 9:
FIG. 9 illustrates an example of a database configuration for managing images with corresponding extracted features, in accordance with an example implementation.
Figure 9:
Figure 9:
Figure 9:
Figure 9:

FIG. 9 illustrates an example of a database configuration for managing images with corresponding extracted features, in accordance with an example implementation. In the example implementation of FIG. 9, the image database can manage images with parameters such as the image identifier (ID), the image, the time stamp of the image in the video, the camera ID of the camera that captured the image, the trajectory ID of the trajectory taken by the image, extracted image features, and derived attributes of the image.

FIG. 10 illustrates an example flow diagram in accordance with an example implementation. At 1000, an image is loaded from the camera. At 1001, the flow executes a person detection process to detect people from the image through execution of person detection and tracing unit 712. At 1002, an iterative loop is executed for each person detected in the person detection process.

At 1003, the flow extracts image features and classifies the attributes through execution of the features extraction unit 713. At 1004, the extracted image features and classified attributes are stored in the image database 714 as illustrated in FIG. 9.

At 1005, query generating unit 721 generates one or more sample queries. At 1006, a determination is made as to whether the query satisfies the requirements for accuracy as illustrated in FIG. 14. If so (Yes), then the flow proceeds to 1007 to process the query and search for similar images from the image database 714 through executing image retrieving unit 722. At 1008, the search results are filtered by utilizing search result filtering unit 723. At 1009, the flow calculates the travel time through executing travel time calculation unit 724. At 1010, the statistics of the travel time in the image database 714 are updated and exported for display at the display apparatus 702.

In example implementations described herein, a query can be automatically sampled without a user operation, and statistical information can also be automatically calculated without user verification. However, inappropriate queries may generate incorrect similar-image search results. This makes the output statistics less reliable. Accordingly, filtering mechanisms can be employed on the results and on the queries themselves to increase the accuracy.

FIG. 11 illustrates an example of a submitted query with extracted results, in accordance with an example implementation. For example, as shown in FIG. 11, by using second query, the system can obtain a result of the same person with the top similarity. But for other queries, different person is placed on the top similarity, and the use of these results generates wrong travel time.

To address such potential issues, one example implementation involves extracting and using only reliable search results for calculating travel time. In addition to similarity thresholds as described herein, the system can use additional information such as camera topologies and person attributes.

Figure 12:
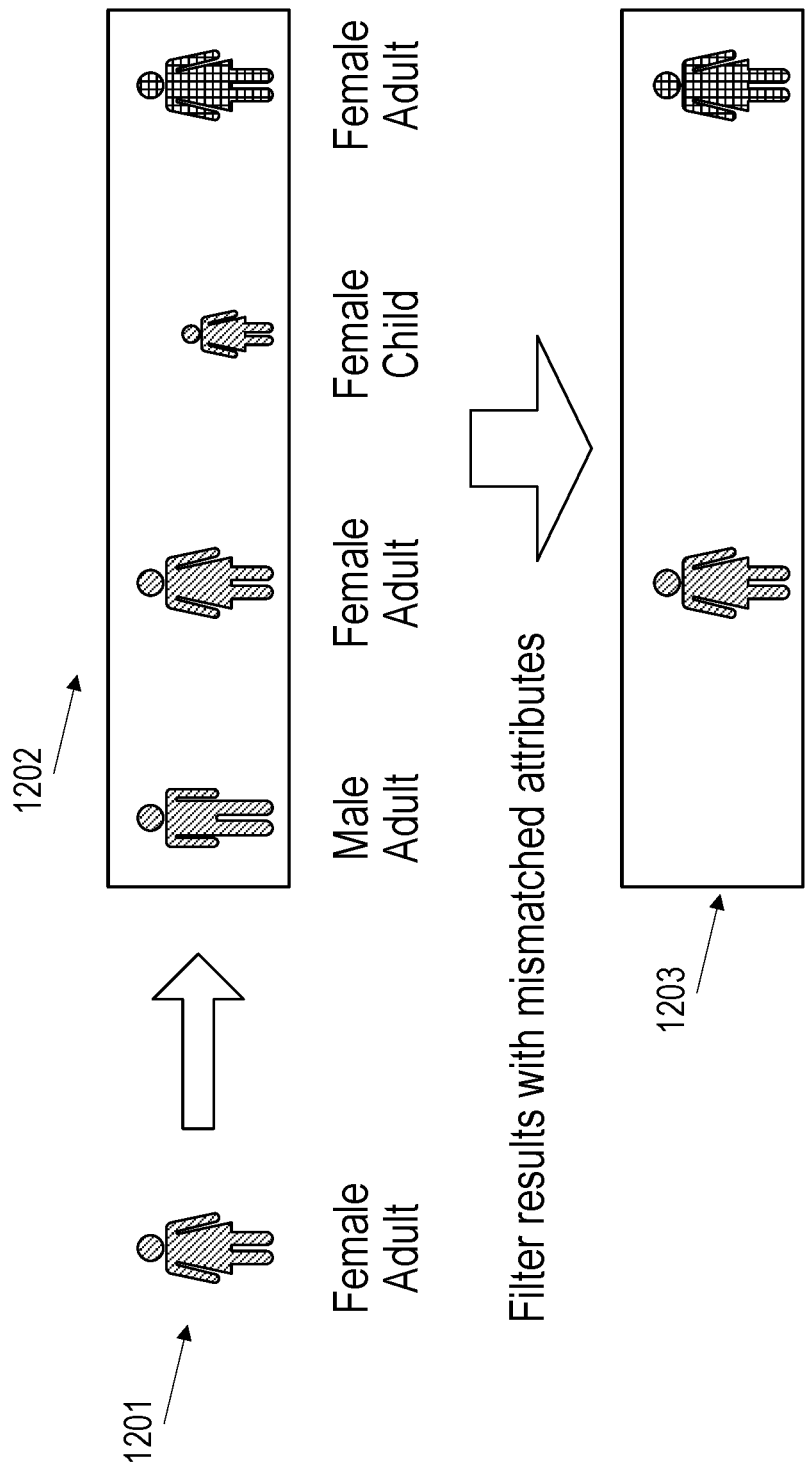
FIG. 12 illustrates an example of filtering search results based on attribute information, in accordance with an example implementation.

FIG. 12 illustrates an example of filtering search results based on attribute information, in accordance with an example implementation. In an example method of using attributes information, the system can remove results having attributes that do not match with the query attributes. In FIG. 12, in response to the query 1201 involving an image of a female adult, the first search result in the search results 1202 has a different gender attribute (male adult versus female adult), and the third result that has different age attribute (female child versus female adult), which can be removed by the filtering process by search results filtering unit 723 to generate the filtered results 1203. Since the attribute estimation itself may be inaccurate, only the result with high reliability of attribute estimation can be used (e.g., above a preset threshold).

FIG. 13 illustrates an example of filtering search results through the use of camera topologies, in accordance with an example implementation. In the example of FIG. 13, the system stores available routes and the minimum time required to travel point-to-point as illustrated at 1300. The system can remove inappropriate results through using this information. For example, for results 1301 generated in response to queries 1302, the system can detect inappropriate results if (1) there is no direct route exists, (2) time periods are overlapping, and/or (3) travel time is too short.

The above describes about the filtering inaccurate data after search. Another example implementation described below is a method of filtering inaccurate data before search by sampling suitable query for tracking.

FIG. 14 illustrates an example of filtering results based on query sampling, in accordance with an example implementation. In the example of FIG. 14, the system automatically creates a test-set in which the images have tracking ID as a ground truth. This is based on an assumption that the person images on the same trajectory are the same person, and different trajectories represent different people as shown at 1401.

The system searches the test-set database by using a sampled query, and calculates the accuracy of image search by using an automatically annotated ground truth. By using a query having an accuracy calculated to be high against the test-set, the search accuracy of image database improves, and the system can generate reliable statistics of travel time. In the example of FIG. 14, the good query 1401 has sufficient accuracy over a preset threshold (e.g., four out of the five results were the correct results extracted from the test set), whereas bad query 1402 did not have sufficient accuracy over the preset threshold (e.g., two out of the five results extracted from the test set were the correct results, with the majority being incorrect).

Figure 15B:
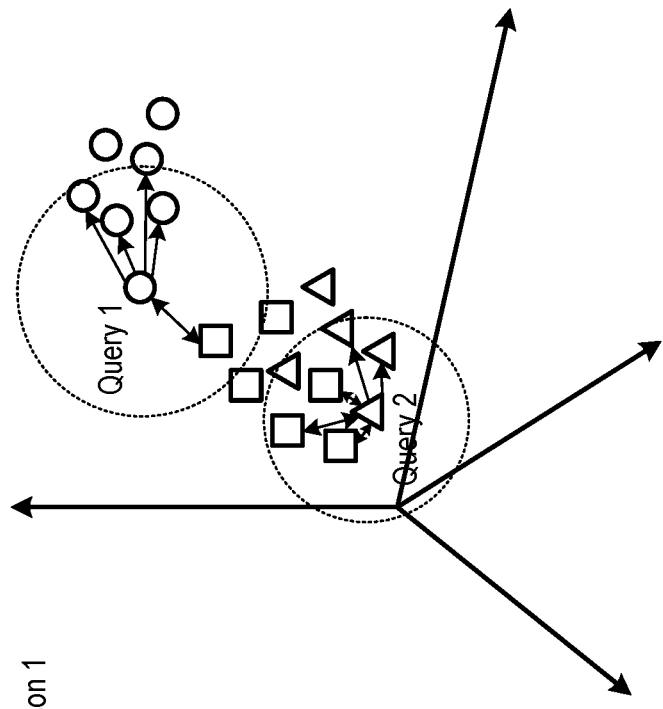
FIG. 15(a) and FIG. 15(b) illustrate an example distribution of person images in feature space, in accordance with an example implementation.
Figure 15A:
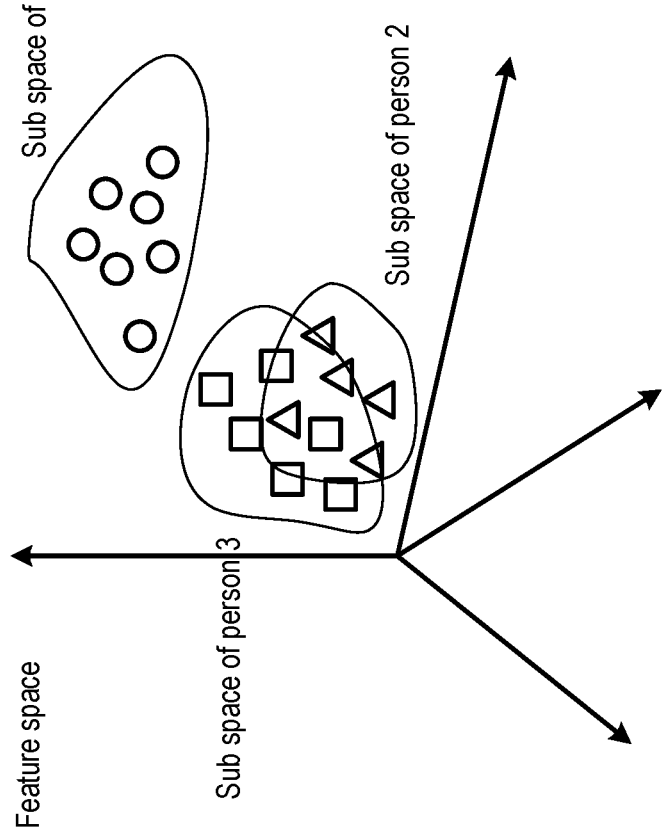

FIG. 15(a) and FIG. 15(b) illustrate an example distribution of person images in feature space, in accordance with an example implementation. The same person images in the same trajectory forms a sub space in the future space. People who are difficult to distinguish from others have an overlapping sub space. The image search can include a process of acquiring images around the query in the order in which the distance between the feature vectors is small. Therefore, if the search result of the test-set contains fewer errors, the person can be a suitable candidate for tracking.

In the example illustrated in FIG. 15(a), there are three subspaces representing three different persons in the feature space. As illustrated in FIG. 15(a), the subspace of person 1 is more distinguishable from the subspaces of persons 2 and 3, who have substantial overlap. Accordingly, when a query is formed as shown in FIG. 15(b), the person of subspace 1 is a better candidate for tracking than persons 2 and 3, as there is little overlap in comparison to the other persons. In contrast, query 2 in FIG. 15(b) would result in overlap between persons 2 and 3 due to their overlapping subspaces in FIG. 15(a), and can therefore be filtered as a candidate.

Figure 16:
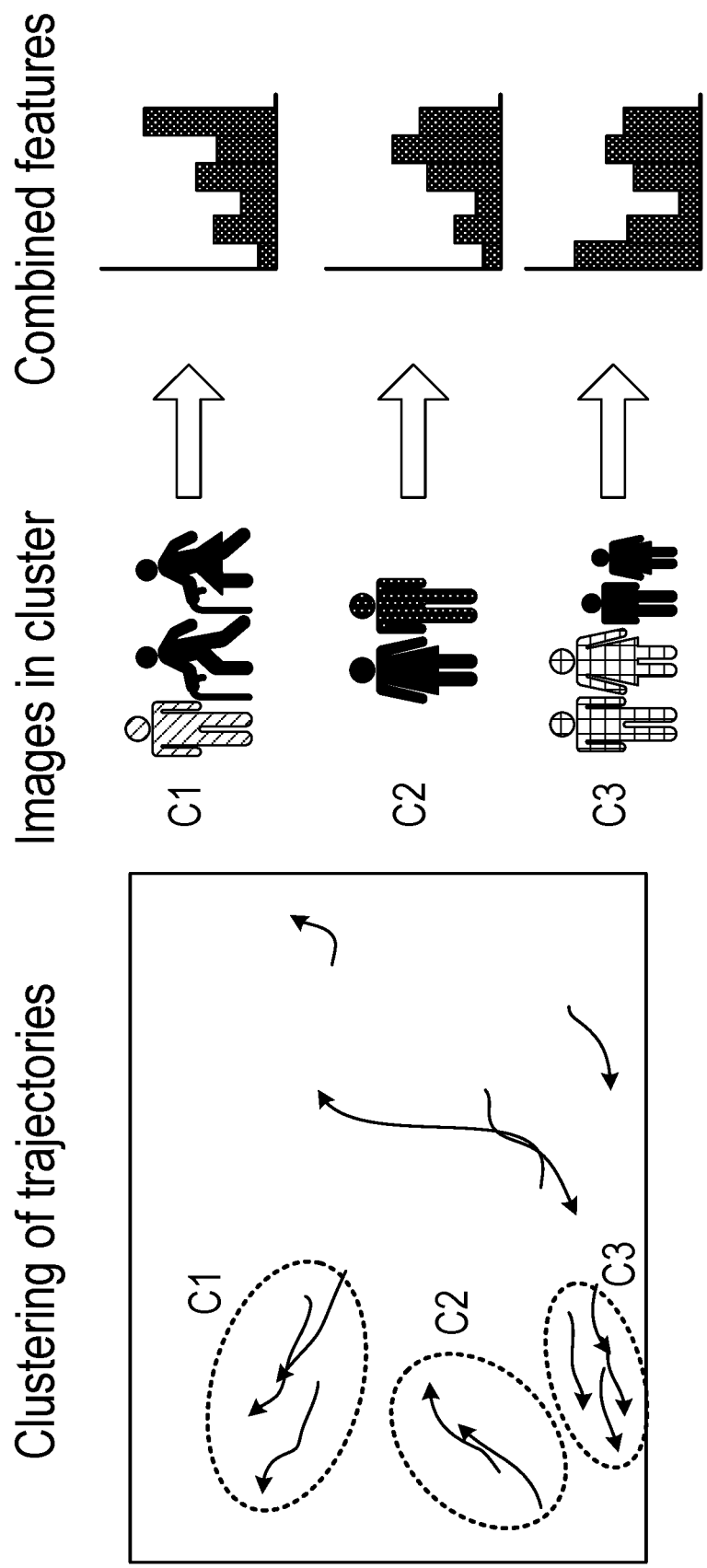
FIG. 16 illustrates an example of generating sample queries through use of group features, in accordance with an example implementation.

Another example implementation of creating a suitable query can involve a method using group features as illustrated in FIG. 16. FIG. 16 illustrates an example of generating sample queries through use of group features, in accordance with an example implementation. In a scene where many people come and go, image features extracted from one person may not have enough information to distinguish it from others. To solve this, in an example implementation, the system assumes multiple people as one group and tracks groups across cameras. For example, since family members or friends move together, similar image features can be extracted from group images captured from different cameras. Example implementations can involve trajectories in a camera to determine groups. Trajectories are clustered by their values such as location, time, speed, direction, and so on in accordance with the desired implementation. The system extracts image features from person images in a trajectory cluster. These features are accumulated to one feature vector and used to search similar groups. Accordingly, a person can thereby also be tracked based on the one or more other persons in proximity based on their consistent trajectory.

Through example implementations described herein, it is possible to estimate travel time of moving objects between areas without user operation. The statistics of travel time can be used to optimize layout of facilities. Further, by storing long-term statistics, and by comparing the statistics with the newly estimated travel time, the system can detect anomalies to be used for safety improvement.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   detecting and tracking a person from images from a first camera;
   extracting image features from the detected and tracked person from the images from the first camera;
   storing the image features with information associated with the camera into a database;
   conducting a sample query to search the database for another person detected from images from a second camera;
   for the another person being within a threshold of similarity of the person from the images of the first camera;
   determining a gap of time between the person from the images of the first camera and the another person from the images from the second camera; and
   calculating travel time for the person from the gap of time,
   wherein the detecting and the tracking the person from the images from the first camera further comprises detecting and tracking one or more other persons in proximity to the person, and
   wherein the extracting the image features from the detected and tracked person from the images from the first camera further comprises extracting the image features from the one or more other persons in proximity to the person to derive group features.

2. The method of claim 1, wherein the conducting the sample query to search the database for another person detected from the images from the second camera comprises:
   obtaining results from the database based on feature matching with the image features associated with the sample query;
   filtering the results from the database associated with persons associated with cameras having no direct route to an area associated with the second camera;
   filtering the results from the database having overlapping image detection between the first camera and the second camera; and
   filtering the results from the database associated with persons having a travel time that does not exceed a threshold.

3. The method of claim 1, wherein the conducting the sample query to search the database for another person detected from the images from the second camera comprises:
   obtaining results from the database based on feature matching with the image features associated with the sample query; and
   filtering the results from the database based on person attributes.

4. The method of claim 1, wherein the conducting the sample query to search the database for another person detected from the images from the second camera comprises evaluating the sample query, the evaluating the sample query comprising:
   generating a test set from the images of the another person from the second camera along a trajectory over time;
   associating the test set with a camera identifier associated with the second camera;
   searching the test set with the sample query based on feature matching with the image features associated with the sample query;
   for the sample query retrieving results from the test set that does not meet an accuracy threshold, discarding the sample query.

5. A non-transitory computer readable medium, storing instructions for executing a process, the instructions comprising:
   detecting and tracking a person from images from a first camera;
   extracting image features from the detected and tracked person from the images from the first camera;

storing the image features with information associated with the camera into a database;

conducting a sample query to search the database for another person detected from images from a second camera;

for the another person being within a threshold of similarity of the person from the images of the first camera:

determining a gap of time between the person from the images of the first camera and the another person from the images from the second camera; and calculating travel time for the person from the gap of time, wherein the detecting and the tracking the person from the images from the first camera further comprises detecting and tracking one or more other persons in proximity to the person, and wherein the extracting the image features from the detected and tracked person from the images from the first camera further comprises extracting the image features from the one or more other persons in proximity to the person to derive group features.

6. The non-transitory computer readable medium of claim 5, wherein the conducting the sample query to search the database for another person detected from the images from the second camera comprises:

obtaining results from the database based on feature matching with the image features associated with the sample query;

filtering the results from the database associated with persons associated with cameras having no direct route to an area associated with the second camera;

filtering the results from the database having overlapping image detection between the first camera and the second camera; and filtering the results from the database associated with persons having a travel time that does not exceed a threshold.

7. The non-transitory computer readable medium of claim 5, wherein the conducting the sample query to search the database for another person detected from the images from the second camera comprises:

obtaining results from the database based on feature matching with the image features associated with the sample query; and filtering the results from the database based on person attributes.

8. The non-transitory computer readable medium of claim 5, wherein the conducting the sample query to search the database for another person detected from the images from the second camera comprises evaluating the sample query, the evaluating the sample query comprising:

generating a test set from the images of the another person from the second camera along a trajectory over time;

associating the test set with a camera identifier associated with the second camera;

searching the test set with the sample query based on feature matching with the image features associated with the sample query;

for the sample query retrieving results from the test set that does not meet an accuracy threshold, discarding the sample query.

9. An apparatus, comprising:

a processor, configured to:

detect and track a person from images from a first camera;

extract image features from the detected and tracked person from the images from the first camera;

store the image features with information associated with the camera into a database;

conduct a sample query to search the database for another person detected from images from a second camera;

for the another person being within a threshold of similarity of the person from the images of the first camera;

determine a gap of time between the person from the images of the first camera and the another person from the images from the second camera; and calculate travel time for the person from the gap of time, wherein the processor is configured to detect and track the person from the images from the first camera by detecting and tracking one or more other persons is proximity to the person, and wherein the processor is configured to extract the image features from the detected and tracked person from the images from the first camera further comprises extracting the image features from the one or more other persons in proximity to the person to derive group features.

10. The apparatus of claim 9, wherein the processor is configured to conduct the sample query to search the database for another person detected from the images from the second camera by:

obtaining results from the database based on feature matching with the image features associated with the sample query;

filtering the results from the database associated with persons associated with cameras having no direct route to an area associated with the second camera;

filtering the results from the database having overlapping image detection between the first camera and the second camera; and filtering the results from the database associated with persons having a travel time that does not exceed a threshold.

11. The apparatus of claim 9, wherein the processor is configured to conduct the sample query to search the database for another person detected from the images from the second camera by:

obtaining results from the database based on feature matching with the image features associated with the sample query; and filtering the results from the database based on person attributes.

12. The apparatus of claim 9, wherein the processor is configured to conduct the sample query to search the database for another person detected from the images from the second camera by evaluating the sample query, the processor configured to evaluate the sample query by:

generating a test set from the images of the another person from the second camera along a trajectory over time;

associating the test set with a camera identifier associated with the second camera;

searching the test set with the sample query based on feature matching with the image features associated with the sample query;

for the sample query retrieving results from the test set that does not meet an accuracy threshold, discarding the sample query.

* * * * *